United States Patent [19]

Yamaki

[11] Patent Number: 5,485,622
[45] Date of Patent: Jan. 16, 1996

[54] PASSWORD PROCESSING SYSTEM FOR COMPUTER

[75] Inventor: Masayo Yamaki, Tokyo, Japan

[73] Assignee: Kabushiki Kaisha Toshiba, Kawasaki, Japan

[21] Appl. No.: 950,589

[22] Filed: Sep. 25, 1992

[30] Foreign Application Priority Data

Oct. 11, 1991 [JP] Japan .................................. 3-264085

[51] Int. Cl.⁶ .............................. G06F 1/00; G06F 12/14
[52] U.S. Cl. .................................. 395/186; 364/DIG. 1; 364/245; 364/246.6; 364/285.4; 364/286.4; 364/286.5; 380/25; 395/726
[58] Field of Search ..................................... 395/725, 800; 380/4, 23, 24, 25, 21

[56] References Cited

U.S. PATENT DOCUMENTS

| | | | |
|---|---|---|---|
| 3,890,601 | 6/1975 | Pietrolewiez | 340/172.5 |
| 4,430,728 | 2/1984 | Beitel et al. | 379/95 |
| 4,454,594 | 6/1984 | Heffron et al. | 395/375 |
| 4,590,470 | 5/1986 | Koenig | 340/825.31 |
| 4,672,533 | 6/1987 | Noble et al. | 395/800 |
| 4,758,718 | 7/1988 | Fujisaki et al. | 235/487 |
| 4,882,474 | 11/1989 | Anderl et al. | 235/380 |
| 4,959,860 | 9/1990 | Watters et al. | 380/4 |
| 5,004,232 | 4/1991 | Wong et al. | 273/435 |
| 5,012,514 | 4/1991 | Renton | 380/4 |
| 5,020,105 | 5/1991 | Rosen et al. | 380/23 |
| 5,091,939 | 2/1992 | Cole et al. | 380/25 |
| 5,111,504 | 5/1992 | Esserman et al. | 380/21 |
| 5,115,508 | 5/1992 | Hatta | 395/725 |
| 5,206,905 | 4/1993 | Lee et al. | 380/4 |
| 5,226,080 | 7/1993 | Cole et al. | 380/25 |

OTHER PUBLICATIONS

Toshiba, Reference Manual, T4400SX Portable Personal Computer, 6 pages, 1991.
Toshiba, Reference Manual, T6400 Series Portable Personal Computer, 9 pages, 1991.
Toshiba, Reference Manual, T3300SL Notebook Computer, 11 pages, 1992.

*Primary Examiner*—Jack B. Harvey
*Assistant Examiner*—Ayaz R. Sheikh
*Attorney, Agent, or Firm*—Oblon, Spivak, McClelland, Maier, & Neustadt

[57] ABSTRACT

A CPU determines whether a password canceller is connected to a system main body prior to execution of password check processing on the basis of stored password information at the start of the system. When the password canceller is connected to the system main body, the CPU clears the stored password information to start the system. However, when the password canceller is not connected to system main body, the CPU executes password check processing and controls the start of the system.

26 Claims, 6 Drawing Sheets

SYSTEM SETUP MENU

──── MEMORY ────
TOTAL        = 4096 KB
BASE         =  640 KB
EXTENDED     = 3328 KB
SHADOW BIOS  =  128 KB

──── DISPLAY ────
DISPLAY ADAPTOR    = VGA COMPATIBLE
DISPLAY DEVICE     = PLASMA
PLASMA DISPLAY MODE= COLOR
PLASMA GRAY SGALE
=NORMAL:SEMI-BRIGHT, INTENSE:BRIGHT

──── HARD DISK ────
CAPACITY     = 120 MB

──── CPU ────
CPU TYPE        = 486DX
CPU CLOCK SPEED = 33 MHZ

──── COM / PRT / FDD ────
SERIAL PORT       = COM1(IRQ4/3F8H)
                  = COM2(IRQ3/2F8H)
BUILT-IN MODEM    = IRQ3 DISABLE
EXPANSION SLOT    = PRINTER
EXTERNAL FDD/PRT  = PRINTER
PRINTER PORT TYPE = OUT PUT

──── OTHERS ────
PROCESSING SPEED   = HIGH
CACHE              = ON
DISPLAY AUTO OFF   = 30 min
NUMLOCK INIT.STATE = ON

──── POWER ON PASSWORD ────
NOT REGISTERED

──── TIME & DATE ────
00:00:00, MON JAN 01, 1990

SAVE SETTINGS AND REBOOT ? (Y/N)
INSERT PASSWORD SERVICE DISK IF NECESSARY.

| (PIN No.) / SIGNAL CONNECTIONS |
|---|
| (9) +PD 7 ←→ (15) −ERROR |
| (8) +PD 6 ←→ (14) −AUTFD |
| (7) +PD 5 ←→ (13) +SELECT |
| (6) +PD 4 ←→ (16) −PINIT |
| (5) +PD 3 ←→ (1) −STROBE |
|            → (10) −ACK |
| (4) +PD 2 ←→ (12) +PE |
| (3) +PD 1 ←→ (17) −SLIN |
| (2) +PD 0 ←→ (11) +BUISY |

FIG. 6

PASSWORD PROCESSING SYSTEM FOR COMPUTER

BACKGROUND OF THE INVENTION

1. Field of the Invention

The present invention relates to a computer system having a function of controlling the start of the system in accordance with a password input by a user.

2. Description of the Related Art

Some conventional computer systems such as personal computers employ a scheme for controlling the start of the systems in accordance with passwords input by users. Each input password is stored in a CMOS memory backed up by a backup battery (internal battery).

A CPU executes password check processing for comparing the password stored in the CMOS memory with a password input by the use at the time of power-on of the system. If a comparison result represents a coincidence, the CPU starts the system. Therefore, when no password is input or an erroneous password is input, the system is not started.

In the manufacturing process for manufacturing such a computer system, data corresponding to a password may be accidentally stored in a CMOS memory. In this state, when the manufactured system is to be started to conduct a test or the like, a password corresponding to the data stored in the CMOS memory must be input. However, when the data stored in the CMOS memory is unknown, the password cannot be input.

Even if the user forgets a password input by him or her, the system cannot be started. In this case, a repairing operation for destroying the storage contents of the CMOS memory must be performed.

In a scheme for controlling the start of a system in accordance with a password, when data corresponding to the password is accidentally input during the manufacture or the user forgets the input password, the system cannot be started. In order to restore the normal state of the system, the cumbersome repairing operation is required to destroy the storage contents of the CMOS memory in which the password is stored.

SUMMARY OF THE INVENTION

It is accordingly an object of the present invention to provide a computer system having a scheme for starting the system in accordance with a password, wherein a password need not be input when specific external hardware is connected to the system, thereby starting the system.

A computer system for controlling the start of the system on the basis of password information according to the present invention comprises means for determining whether specific hardware is connected to the system before password check processing is executed at the start of the system, and means for clearing the stored password information to start the system when the hardware is connected to the system.

According to the present invention, at the start of the system, the determining means determines whether the specific hardware is connected to the system before the password check processing is executed on the basis of the stored password information. The clearing means clears the stored password information to start the system on the basis of a determination result of the determining means when the hardware is connected to the system. When the hardware is not connected to the system, the password check processing is executed to control the start of the system on the basis of a check result.

DETAILED DESCRIPTION OF THE PREFERRED EMBODIMENTS

The preferred embodiment of the present invention will be described with reference to the accompanying drawings.

Figure 1:
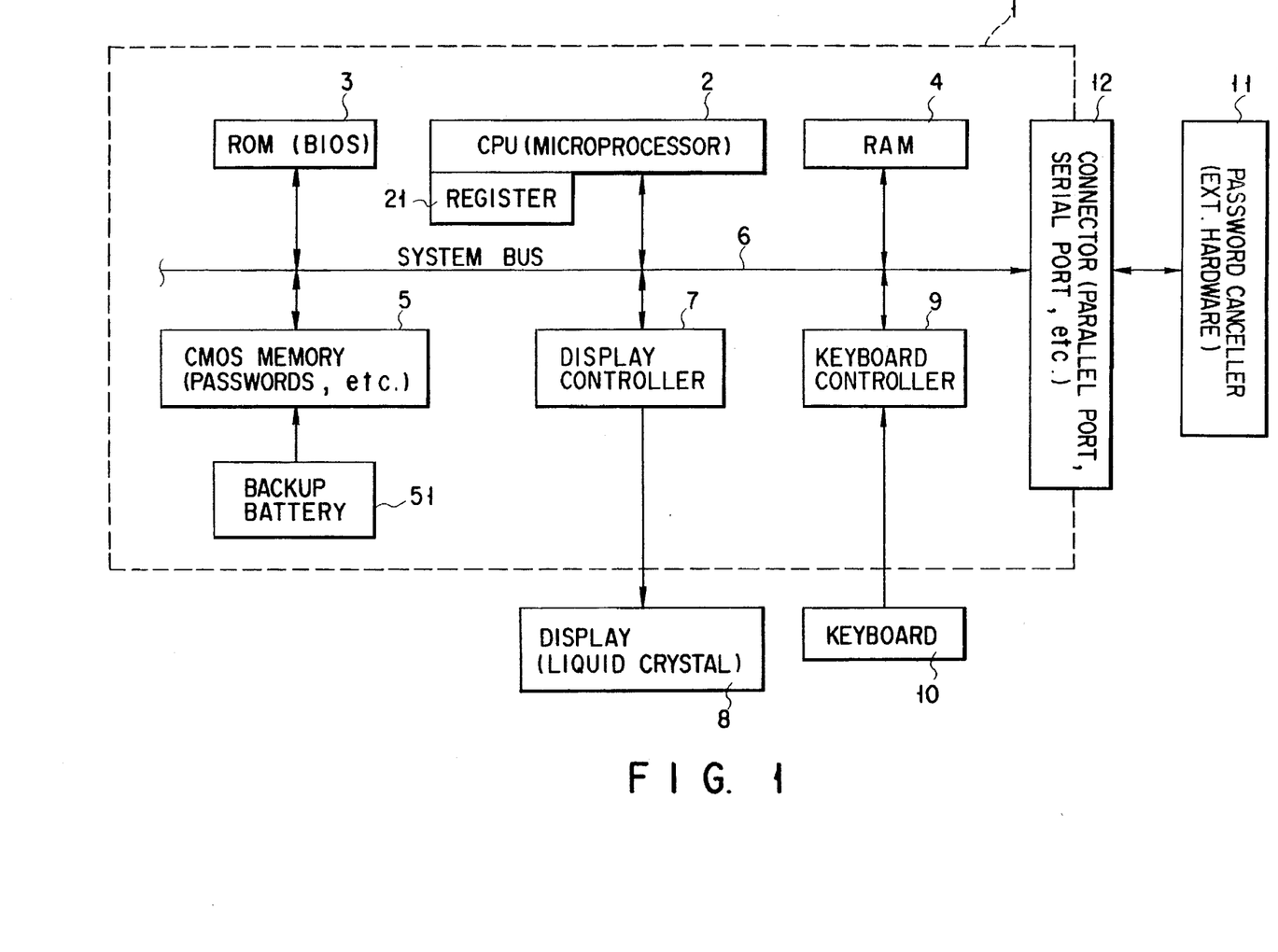
FIG. 1 is a block diagram showing the arrangement of a computer system according to an embodiment of the present invention.

FIG. 1 is a block diagram showing the arrangement of a computer system according to an embodiment of the present invention. This system comprises system main body 1, display 8, and keyboard 10. System main body 1 comprises microprocessor (CPU) 2 having various registers 21, ROM (Read-Only Memory) 3 containing the BIOS of the system, RAM (Read/Write Memory) 4, CMOS memory 5 backed-up by battery 51, system bus 6, display controller 7, and keyboard controller 9.

CPU 2 executes control of the overall system and control of the start of the system in accordance with a password. ROM 3 stores various programs (containing Basic I/O System programs) required for system control operations of CPU 2. The BIOS programs include a SETUP program for inputting a password, a password check routine, a connection determination routine of external hardware (to be described later as a password canceller) according to the present invention, and the like. RAM 4 is a main memory and is used to process various data of CPU 2.

CMOS memory 5 is a RAM backed up by internal battery 51 and serves as a memory for storing input password information (e.g., a 1-byte character code string). Display controller 7 controls the display operation of display 8 under the control of CPU 2 and enables to display a SETUP screen for entering a password. Keyboard controller 9 controls the operation of keyboard 10 and supplies commands, various data, and the like, input from keyboard 10 to CPU 2.

According to the present embodiment, password canceller (external hardware) 11 is provided as an optional unit connected to system main body 1. Password canceller 11 comprises, e.g., a printer port folded connector which is prepared as a specific device and used in the system manufacture and maintenance. CPU 2 detects whether or not password canceller 11 is connected to system main body 1 in accordance with a connection determination routine stored in ROM 3.

The operation of this embodiment will be described with reference to FIGS. 2 and 3.

Figure 2:
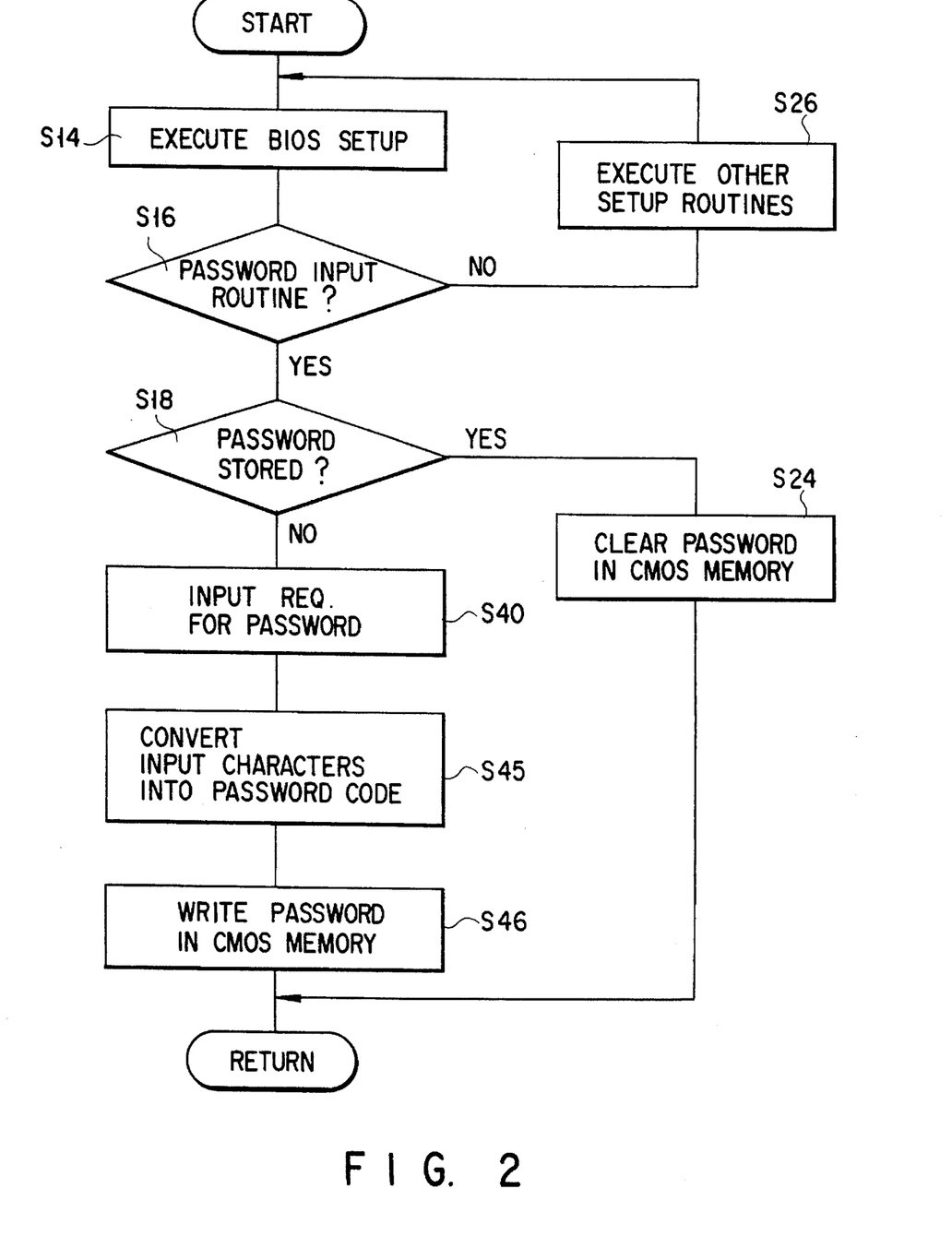
FIGS. 2 and 3 are flow charts each for explaining an operation of the embodiment shown in FIG. 1.
Figure 3:
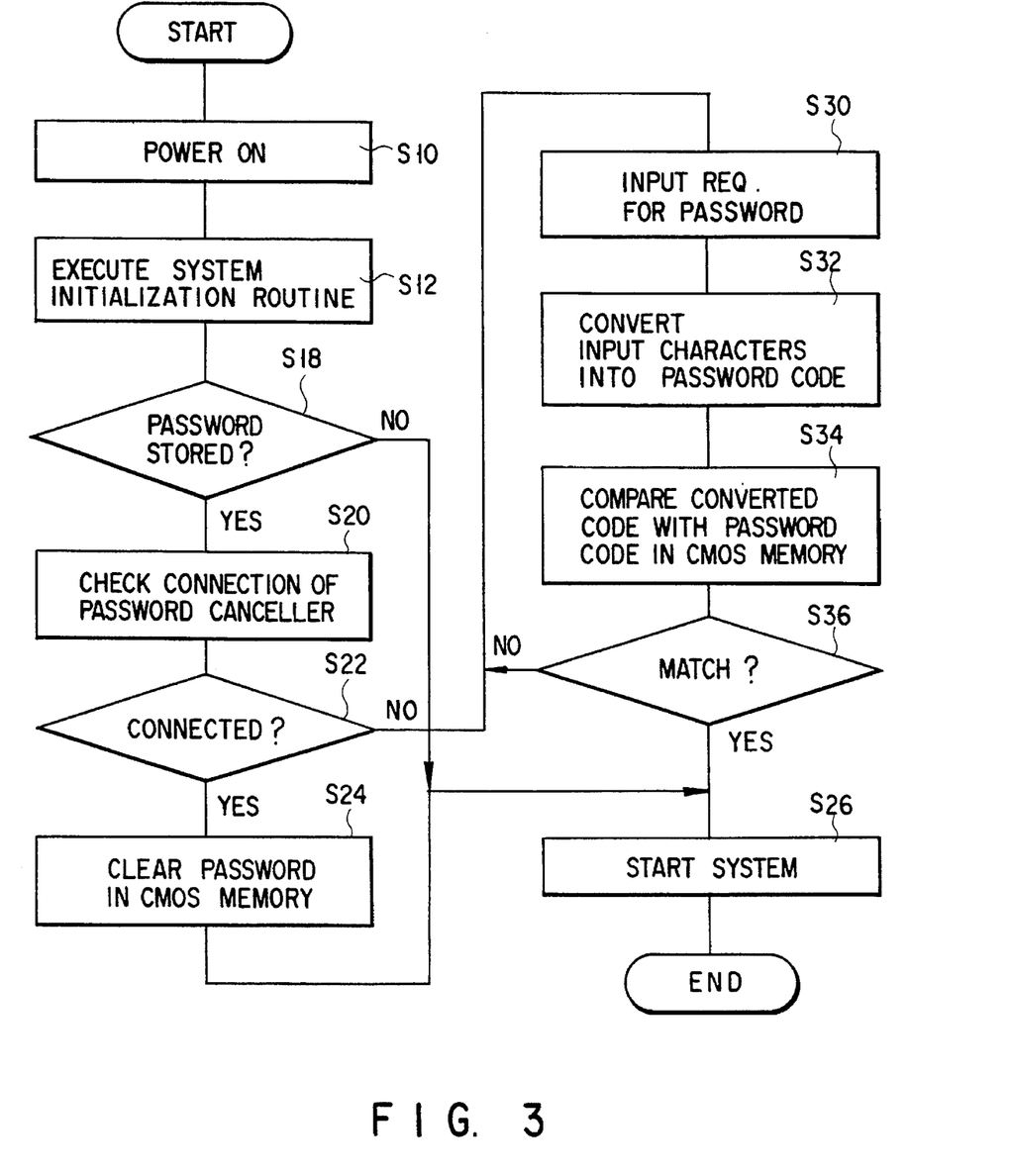
Figure 4:
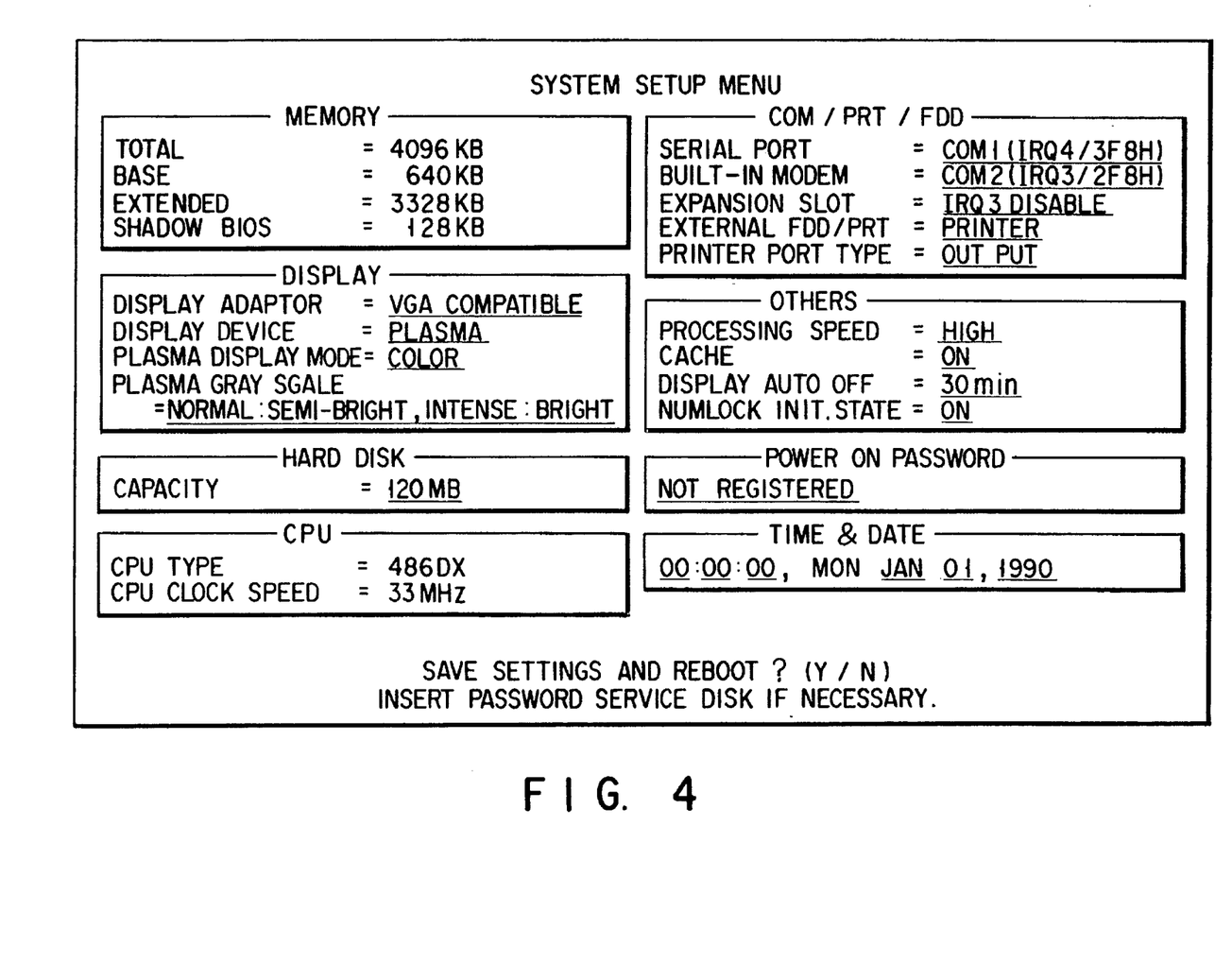
FIG. 4 shows an example of a SETUP screen containing a system setup menu.

In password entering processing, CPU 2 displays the SETUP screen on display 8 (step S14 in FIG. 2). FIG. 4 shows an example of the SETUP screen. The SETUP screen is a screen for setting various modes of the system, which includes a password input mode (indicated as "POWER ON PASSWORD" in FIG. 4). When the password input mode is designated from keyboard 10 (Yes in step S16), CPU 2 executes the password input routine of the SETUP program stored in ROM 3.

CPU 2 accesses CMOS memory 5 to check whether a password has already been stored (step S18). If the password has already been stored (Yes in step S18), CPU 2 executes the password cancel routine to clear the password information stored in CMOS memory 5 (step S24). Otherwise, in place of clearing the stored password, it can be read from memory 5 and may be used by CPU 2 as a key-input password.

If no password is stored (No in step S18), CPU 2 changes the screen of display 8 to display an input request message for inputting the password (step S40). When a character string corresponding to the password is input from keyboard 10, CPU 2 converts the input character string into 1-byte password information (step S45). The password information is information obtained by specific arithmetic processing on the basis of each input character code (e.g., an ASCII code). CPU 2 stores the converted password information in CMOS memory 5 (step S46).

System start control will now be described. When the system is powered on (step S10 in FIG. 3), CPU 2 executes an initialization routine (IRT) stored in ROM 3 to perform initialization processing of the system (step S12).

CPU 2 executes the password check routine included in the IRT to check whether the password information is stored in CMOS memory 5 (step S18). If the password information is not stored (No in step S18), the system is started (step S26).

If the password information is stored (Yes in step S18), CPU 2 performs a system start control mode on the basis of the password input. According to the present invention, CPU 2 executes the connection determination routine stored in ROM 3. CPU 2 determines whether password canceller 11, such as a folded connector, is connected to the printer port of system main body 1 as shown in FIG. 1 (step S20).

When password canceller 11 is connected to system main body 1 (Yes in step S22), CPU 2 executes the password cancel routine to clear the password information stored in CMOS memory 5 (step S24). Therefore, the system start control mode based on the password input is canceled, and the system can be started regardless of the password (step S26).

On the other hand, when password canceller 11 is not connected (NO in step S22), the normal system start control mode based on the password is executed. That is, CPU 2 causes the screen of display 8 to display a password input request message (step S30). When a character string for the stored password is input from keyboard 10, CPU 2 converts this character string into password information (1-byte code) (step S32). In addition, CPU 2 executes processing for comparing the input password information with the password information stored in CMOS memory 5 (step S34). If the comparison result indicates that the former matches the latter (Yes in step S36), the system is started (step S26).

Figure 5:
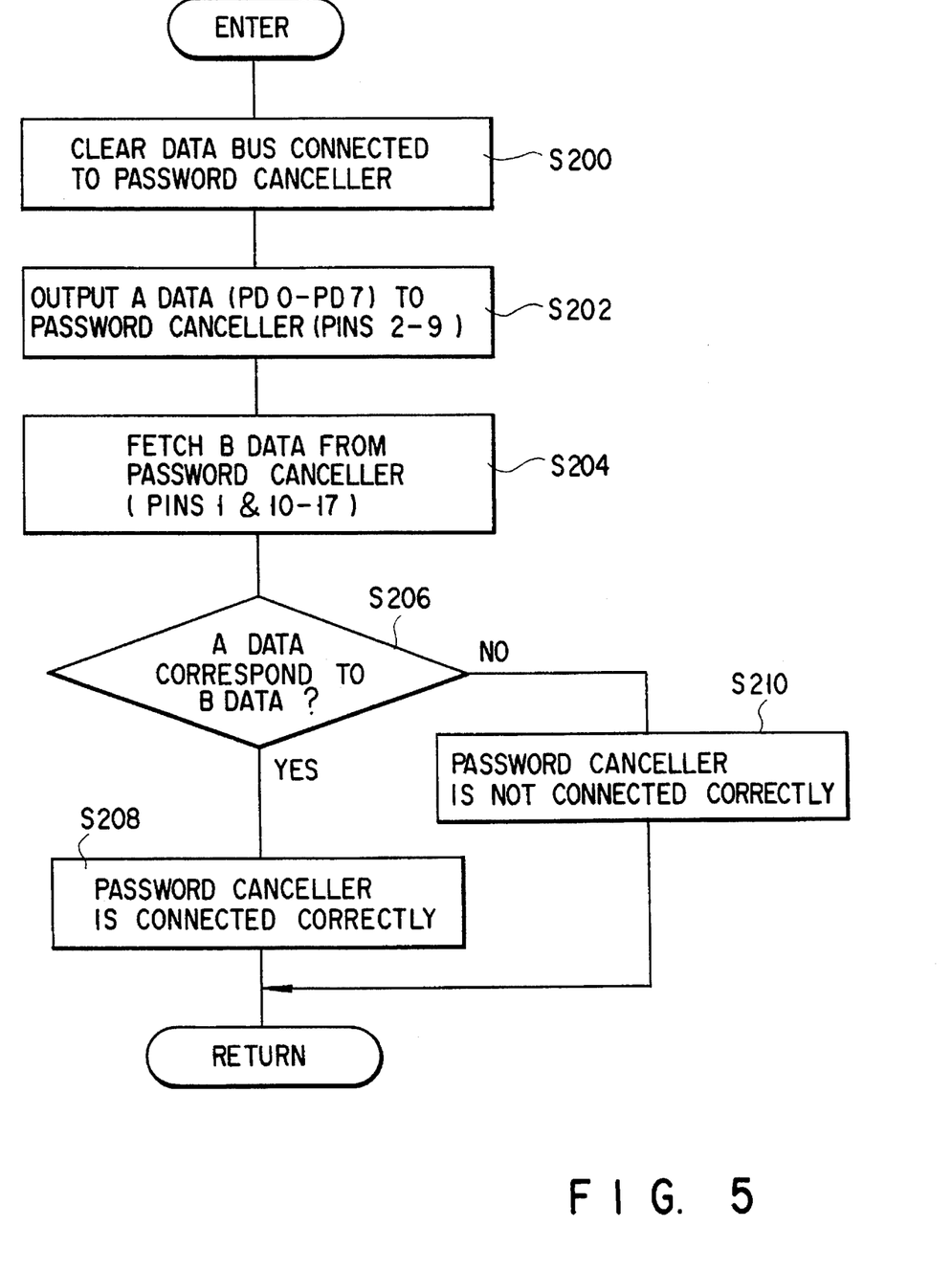
FIG. 5 is a flow chart for explaining another operation of the embodiment shown in FIG. 1.
Figure 6:
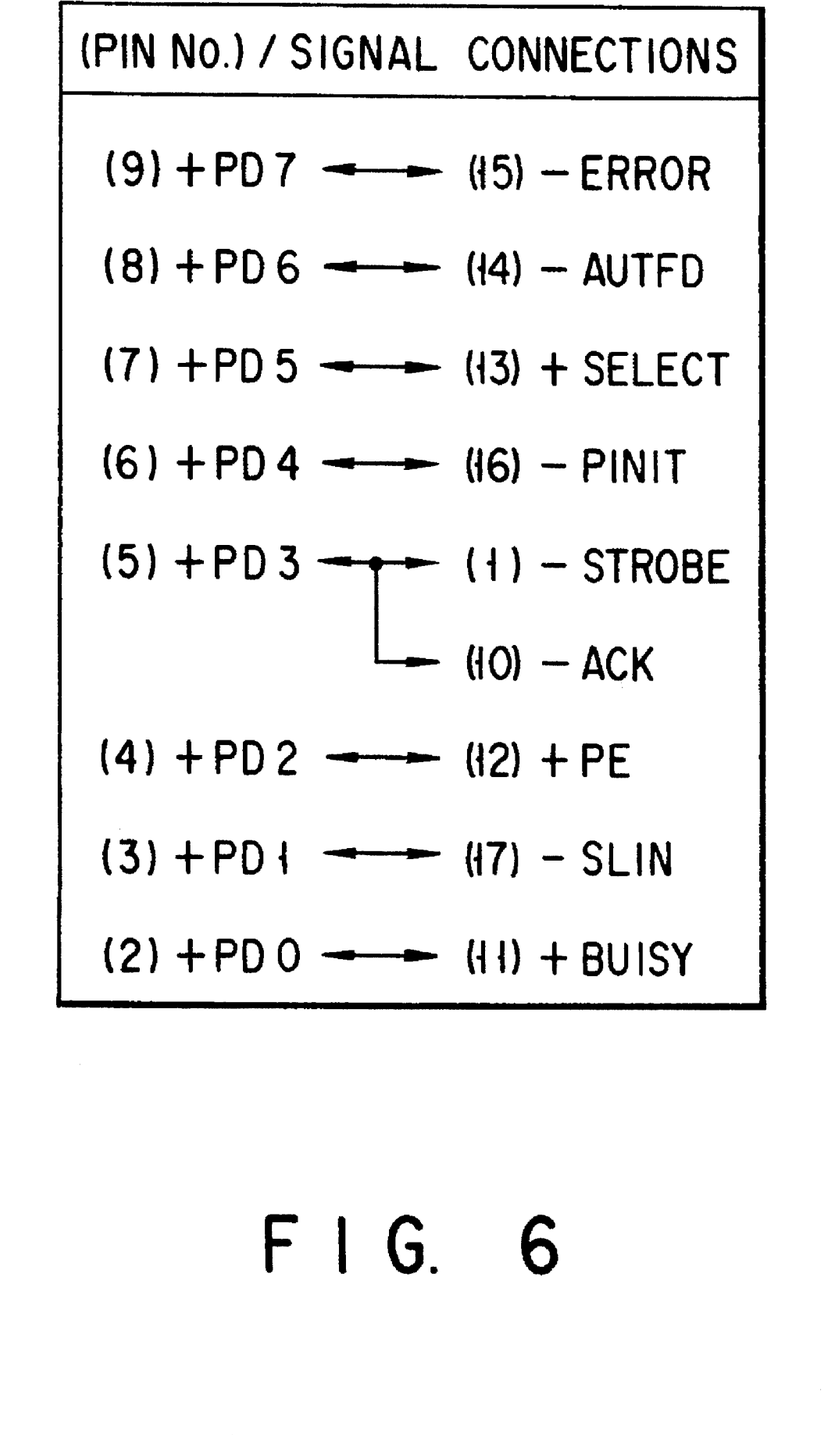
FIG. 6 shows an example of hardware connections of the password canceller shown in FIG. 1.

FIG. 5 is a flowchart for checking a connection of password canceller 11. FIG. 6 exemplifies the connection of password canceller 11, which can be made of a conventional DB25 type multi-pin connector.

When a connection of password canceller 11 is examined, CPU 2 clears bus 6 connected to canceller 11 via port 12 (step S200). CPU 2 sends "A DATA" formed of 8-bit data PD0–PD7 to specific pins (2–9) of connector 12 (step S202). Then, canceller 11 returns 9-bit "B DATA" to specific pins (1 & 10–17) of connector 12 in response to the "A DATA" (step S204).

How the "B DATA" corresponds to the "A DATA" can be known from the illustration of FIG. 6. More specifically, according to the connection shown in FIG. 6, 8-bit data on pins 2, 3, 4, 5, 6, 7, 8, and 9 are respectively transferred to pins 11, 17, 12, 10+1, 16, 13, 14, and 15 (these pins are conventionally used for controlling the operation of a printer).

The "A DATA" and "B DATA" are respectively stored in registers 21 in FIG. 1, and CPU 2 compares the "A DATA" with the "B DATA." When the former corresponds to the latter (Yes in step S206), CPU 2 detects that authorized password canceller 11 is correctly connected to the computer system (step S208). If the former does not correspond to the latter (No in step S206), CPU 2 detects that authorized password canceller 11 is not connected correctly (step S210).

Incidentally, canceller 11 may be connected to bus 6, via a parallel port, serial port, mouse port, and/or joystick port (if provided).

According to the present invention, password canceller (external hardware) 11 is connected to system main body 1 to execute the password cancel routine so that the password-controlled system start mode is cancelled. For example, during the manufacture of the system, even if data corresponding to the password is accidentally stored in CMOS memory 5, this data can be cleared by simply connecting the canceller. Therefore, test processing of the manufactured system can be properly performed while password canceller 11 is kept connected to system main body 1.

In addition, even if the user forgets the password already input by him or her, the password stored in CMOS memory 5 can be cleared by simply connecting password canceller 11 to system main body 1. Thereafter, when the user inputs a password again, system start control can be re-activated. In other words, only the password data stored in CMOS memory 5 can be cleared without performing a repairing operation for destroying all the storage contents of CMOS memory 5, and the system can be set in the start state.

Since password canceller (external hardware) 11 is a specific device prepared for the manufacture and maintenance of the system, the stored password will not be accidentally erased by a user using a conventional external device such as a printer.

As has been described above, in a system employing a password-controlled scheme wherein the password or data corresponding thereto has been stored, specific external hardware is connected to the system to clear the stored password or the data corresponding thereto. Even if data corresponding to the password is accidentally input during the manufacturing process, or if a user forgets the password input by him or her, the system start control mode by the password can be canceled so as to start the system. Therefore, the system can be started without performing a cumbersome repairing operation for destroying the storage contents of the COM memory which stores the password, etc.

What is claimed is:

1. A password processing system for a computer, comprising:

first storing means for storing a password necessary for the operation of the system;

querying means to query a user for a response to a password challenge;

second storing means coupled to said first storing means for storing a first program by which whether or not a computer can be started in accordance with a concurrence between the stored password and the response from the user;

third storing means for storing a second program by which the stored password can be discarded or ignored;

first program executing means coupled to said first storing means and said second storing means for executing the first program stored in said second storing means based on the password stored in said first storing means;

connecting means for removably connecting a password bypass device to the password processing system;

providing means, coupled to said third storing means, for providing a password canceling data in response to a connection of the password bypass device by said connecting means; and second program executing means for executing the second program stored in said third storing means, so as to discard or ignore the password stored in said first storing means when the password cancelling data is provided by said providing means, thereby allowing the computer to start regardless of the password; and wherein said first and second executing means are coupled to said computer.

2. A system according to claim 1, wherein the computer includes:

a system bus coupled to said second program executing means; and a connector, having a given number of connection pins, for connecting an external device of the computer to said system bus.

3. A system according to claim 2, wherein said connector includes a parallel port of the computer.

4. A system according to claim 2, wherein said connector includes a serial port of the computer.

5. A system according to claim 2, wherein said providing means is formed of said external device which can be optionally connected to said second program executing means, via said connector and said system bus.

6. A system according to claim 2, wherein said second program executing means includes:

means for supplying a first data to a part of the connection pins of said connector;

means for receiving a second data from another part of the connection pins of said connector;

means for comparing the first data with the second data so as to detect whether or not the former corresponds to the latter; and means for discarding or ignoring the password when said comparing means detects that the first data corresponds to the second data.

7. A system according to claim 6, wherein said second program executing means further includes:

register means for independently storing the first data and the second data, wherein the first data stored in said register means is compared by said comparing means with the second data stored in said register means which is obtained when said external device is connected to said connector.

8. A system according to claim 6, wherein said connector is formed of a parallel port connector having data pins for handling n-bit data where n is a natural number, and control pins for handling data for controlling an operation of an external device which can be connected to said system bus via said connector.

9. A system according to claim 8, wherein said providing means includes a password canceller which can be optionally connected to said second program executing means via said parallel port connector, wherein said password canceller comprises:

means for electrically connecting the data pins to the control pins of said parallel port connector.

10. A computer system in which start of said computer system is controlled on the basis of password information, comprising:

means for inputting password information for the operation of said computer system;

means for storing the password information input by said inputting means;

means for querying a user for a password;

means for detecting whether a bypass device is connected to the computer upon a system power-on operation;

means for comparing the stored password and a response from the user when queried for a password;

means for preventing the starting of the computer system if the stored password does not match the response from a user when queried for a password; and means for starting the computer system regardless of password information stored in said storing means when a result of detection by said detecting means represents that said bypass device is connected to said computer system.

11. A computer system for executing programs containing an initialization routine, a password check routine, and a password clear routine, comprising:

means for storing a password in said system;

means for querying a user for a password;

means for executing the initialization routine after a power-on of the computer system;

means for checking whether or not the password supplied by the user in response to the query is the same as that stored in said storing means, after the initialization routine is executed by said executing means;

means for detecting if an external device having a predetermined electrical configuration is connected to the computer system;

means for executing the password clear routine if said detecting means detects that the external device is connected to the computer system thereby starting an operation of the computer system;

means for executing the password check routine if said detecting means detects that the external device is not connected to the computer system, thereby preventing the start of the computer system unless information corresponding to the password stored in said storing means is input to the computer system in response to said query of the user.

12. A computer system for executing programs containing an initialization routine, a password check routine, and a password clear routine, comprising:

means for storing a password;

means for querying a user for a password;

means for executing the initialization routine after a power-on of the computer system;

means for checking whether or not the password supplied by the user in response to said query is stored in said storing means, after the initialization routine is executed by said executing means;

means for detecting if an external device having a predetermined electrical configuration is connected to the computer system;

means for providing a first specific data to the external device if said detecting means detects that the external device is connected to the computer system;

means for fetching from the external device a second specific data corresponding to the first specific data, a correspondence between the first and second specific data being determined by the predetermined electrical configuration of the external device;

means for checking the correspondence between the first and second specific data;

first determining means for determining that the external device connected to the computer system is valid if the first specific data corresponds to the second specific data;

second determining means for determining that the external device connected to the computer system is invalid if the first specific data does not correspond to the second specific data;

means for executing the password clear routine if said first determining means determine that the external device connected to the computer system is valid;

means for executing the password check routine if said second determining means determines that the external device connected to the computer system is invalid, thereby preventing the start of the computer system unless information corresponding to the password stored in said storing means is input to the computer system.

13. A method of executing programs in a computer containing an initialization routine, a password check routine, and a password clear routine, comprising:

storing a password in a memory;

executing the initialization routine after a power-on of the computer system;

querying a user for a password;

checking whether or not the password supplied in response to the query of the user is the same as what is stored in the memory after the initialization routine is executed;

detecting if an external device having a predetermined electrical configuration is connected to the computer system;

executing a password clear routine if the external device is connected to the computer system, thereby starting an operation of the computer system;

executing a password check routine if the external device is not connected to the computer system, thereby preventing the start of the computer system unless information corresponding to the stored password is input to the computer system.

14. A method for executing programs containing an initialization routine, a password check routine, and a password clear routine, comprising:

storing a password in a memory;

executing the initialization routine after a power-on of the computer system;

querying a user for a password;

checking whether or not the password supplied by the user in response to said query is the same as the password stored after the initialization routine is executed;

detecting if an external device having a predetermined electrical configuration is connected to the computer system;

providing a first specific data to the external device if the external device is connected to the computer system;

fetching from the external device a second specific data corresponding to the first specific data, a correspondence between the first and second specific data being determined by the predetermined electrical configuration of the external device;

checking the correspondence between the first and second specific data;

determining that the external device connected to the computer system is valid if the first specific data corresponds to the second specific data;

determining that the external device connected to the computer system is invalid if the first specific data does not correspond to the second specific data;

executing the password clear routine if it is determined that the external device connected to the computer system is valid;

executing the password check routine if it is determined that the external device connected to the computer system is invalid, thereby preventing the start of the computer system unless information corresponding to the stored password is input to the computer system.

15. A computer system, comprising:

a data input device inputting password data;

a memory storing the password data input from the data input device;

means to query a user for a password coupled to said data input device;

a connector removably connecting an external device to the computer system;

a password bypass device removably connected to the connector;

means for preventing the computer system from operating unless the response to the query from the data input device after the computer system is powered on, corresponds to password data previously stored in the memory;

means for detecting whether the password bypass device is connected to the connector when the computer system is powered on; and means for permitting the operation of the computer system without the input of the output data when the detecting means detects the password bypass device is connected to the connector.

16. A computer system according to claim 15, wherein the connector has a parallel port.

17. A computer system according to claim 15, wherein the connector has a serial port.

18. A computer system according to claim 15, wherein the connector has a mouse port.

19. A computer system according to claim 15, wherein the connector has a joystick port.

20. A computer system according to claim 15, further comprising means for erasing password data stored in the memory when the detecting means detects the password bypass device is connected to the connector.

21. A computer system, comprising:

a keyboard inputting a password data;

a non-volatile memory storing the password data input from the keyboard;

means for querying a user for a password;

an external connector removably connecting an external device to the computer system;

means for preventing the computer system from operating unless the password data stored in the non-volatile memory corresponds to the response to the password query input from the keyboard after the computer system is powered on when the password data is stored in the non-volatile memory;

a cancel device removably connected to the external connector, a kind of the cancel device being different from a kind of the external device;

means for detecting whether the cancel device is connected to the external connector when the computer system is powered on; and means for invalidating the password data stored in the non-volatile memory so that the computer system operates without the correspondence of the password data with the input data when the detecting means detects the cancel device is connected to the external connector.

22. A computer system according to claim 21, wherein the connector has a parallel port.

23. A computer system according to claim 21, wherein the connector has a serial port.

24. A computer system according to claim 21, wherein the connector has a mouse port.

25. A computer system according to claim 21, wherein the connector has a joystick port.

26. A computer system according to claim 21, further comprising means for erasing the password data when the detecting means detects the cancel device is connected to the external connector.

* * * * *